US012632037B2

(12) United States Patent
Wiese et al.

(10) Patent No.: US 12,632,037 B2
(45) Date of Patent: May 19, 2026

(54) METHOD FOR EDGE-TIME SYNCHRONIZED DATA ACQUISITION FOR MULTIPLE DEVICE SUBSYSTEMS AND DIGITAL TWINS

(71) Applicant: Rockwell Automation Technologies, Inc., Mayfield Heights, OH (US)

(72) Inventors: Todd A Wiese, Hubertus, WI (US); David Christopher Mazur, Grafton, WI (US); Jonathan A Mills, Mayfield Heights, OH (US); Nathaniel Scott Sandler, Chagrin Falls, OH (US); Robert H Schmidt, Germantown, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 374 days.

(21) Appl. No.: 18/459,776

(22) Filed: Sep. 1, 2023

(65) Prior Publication Data

US 2025/0076848 A1     Mar. 6, 2025

(51) Int. Cl.
G05B 19/4155     (2006.01)

(52) U.S. Cl.
CPC ................... *G05B 19/4155* (2013.01); *G05B 2219/31368* (2013.01)

(58) Field of Classification Search
CPC ................. G05B 19/4155; G05B 2219/31368
USPC .......................................................... 700/49
See application file for complete search history.

(56) References Cited

U.S. PATENT DOCUMENTS

2022/0120915 A1*   4/2022   Hoptroff ............... H04L 43/106

* cited by examiner

*Primary Examiner* — Mohammad Ali
(74) *Attorney, Agent, or Firm* — Amin, Turocy & Watson, LLP

(57) ABSTRACT

Industrial devices and edge compute platforms are configured to synchronize their internal clocks to provide a common sense of time across application and data acquisition tasks, thereby allowing for an inherent common understanding of time across the devices and data sets. The industrial devices can synchronize their internal clocks using Precision Time Protocol (PTP) or IEEE 802.1AS synchronization. The accurate time stamping achieved by this synchronization can yield more accurate analysis of data sets acquired from multiple devices, and greater fidelity and synchronization between a digital twin of an automation system and the physical system represented by the digital twin.

20 Claims, 11 Drawing Sheets

EDGE DEVICE 202

USER INTERFACE COMPONENT 204

EDGE GATEWAY COMPONENT 206

MODELING COMPONENT 208

ANALYTICS COMPONENT 210

SYNCHRONIZATION COMPONENT 212

PROCESSOR(S) 218

MEMORY 220

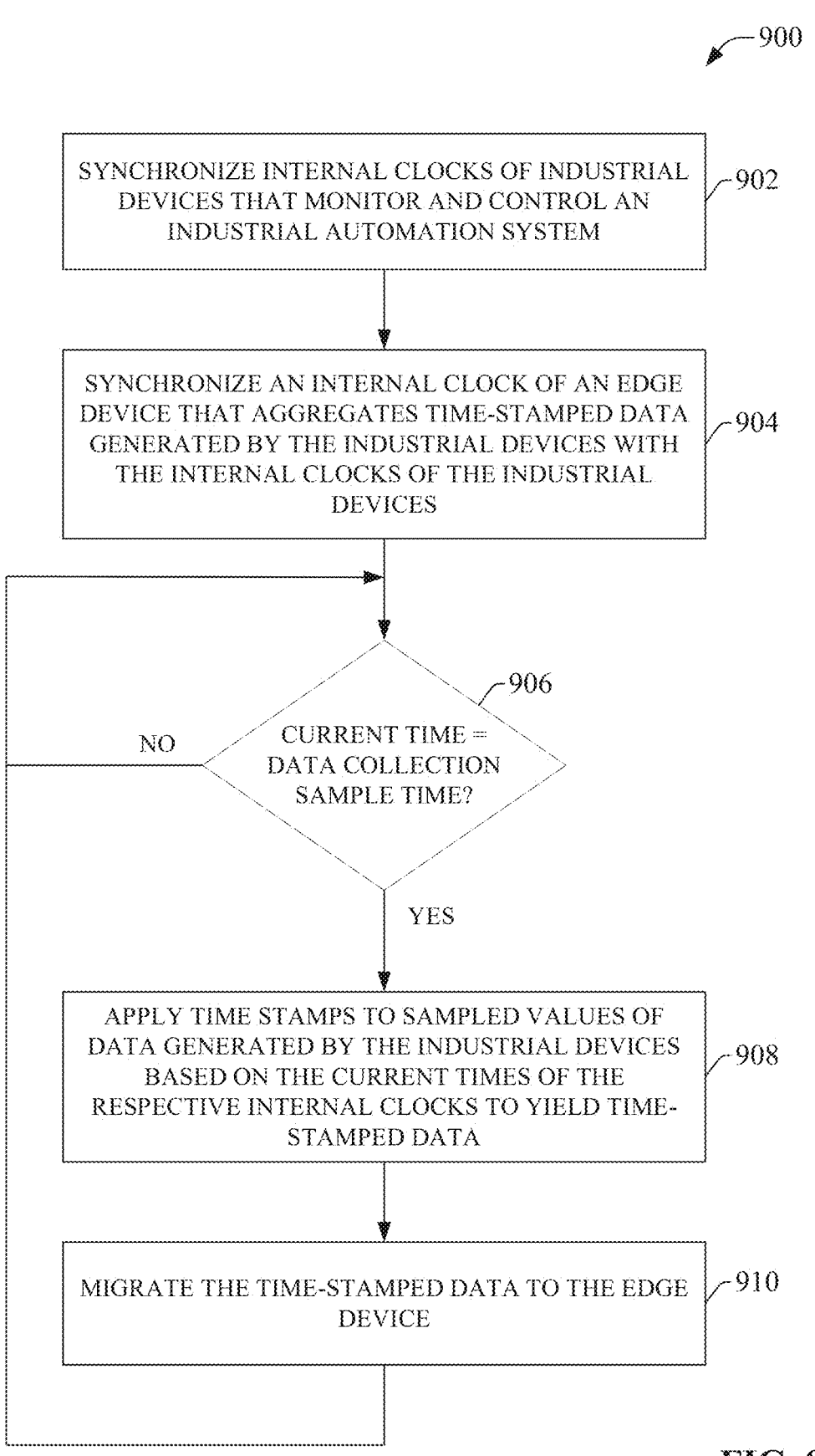

900

SYNCHRONIZE INTERNAL CLOCKS OF INDUSTRIAL DEVICES THAT MONITOR AND CONTROL AN INDUSTRIAL AUTOMATION SYSTEM — 902

SYNCHRONIZE AN INTERNAL CLOCK OF AN EDGE DEVICE THAT AGGREGATES TIME-STAMPED DATA GENERATED BY THE INDUSTRIAL DEVICES WITH THE INTERNAL CLOCKS OF THE INDUSTRIAL DEVICES — 904

906

CURRENT TIME = DATA COLLECTION SAMPLE TIME?

NO

YES

APPLY TIME STAMPS TO SAMPLED VALUES OF DATA GENERATED BY THE INDUSTRIAL DEVICES BASED ON THE CURRENT TIMES OF THE RESPECTIVE INTERNAL CLOCKS TO YIELD TIME-STAMPED DATA — 908

MIGRATE THE TIME-STAMPED DATA TO THE EDGE DEVICE — 910

FIG. 9

METHOD FOR EDGE-TIME SYNCHRONIZED DATA ACQUISITION FOR MULTIPLE DEVICE SUBSYSTEMS AND DIGITAL TWINS

TECHNICAL FIELD

The subject matter disclosed herein relates generally to industrial automation systems, and, for example, to collection and analysis of industrial data.

BACKGROUND ART

As industrial enterprises become increasingly reliant on high level analytic or simulation systems to gain deeper insights into their manufacturing systems and processes, on-premise edge devices are being used to aggregate data of interest from industrial devices and migrate that data to higher level systems for storage, visualization, or analysis. In some cases, these edge devices may also perform edge-level analysis of industrial data aggregated from multiple data sources (e.g., industrial controllers, telemetry devices, sensors, etc.), allowing data to be captured and analyzed at or near the source devices.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising an edge gateway component configured to collect device data from industrial devices that monitor and control an industrial automation system; and a synchronization component configured to synchronize an internal clock of the system with internal clocks of the industrial devices, wherein the internal clocks of the industrial devices are synchronized with one another and are used by the industrial devices to apply time stamps to the device data.

Also, one or more embodiments provide a method, comprising synchronizing, by an edge device comprising a processor, an internal clock of the edge device with internal clocks of industrial devices that monitor and control an industrial automation system, wherein the internal clocks of the industrial devices are synchronized with one another and are used by the industrial devices to apply time stamps to device data generated by the industrial devices to yield time-stamped device data; and collecting, by the edge device, the time-stamped device data from the industrial devices.

Also, according to one or more embodiments, a non-transitory computer-readable medium is provided having stored thereon instructions that, in response to execution, cause a system executing on a cloud platform to perform operations, the operations comprising synchronizing an internal clock of the edge device with internal clocks of industrial devices that monitor and control an industrial automation system, wherein the internal clocks of the industrial devices are synchronized with one another and are used by the industrial devices to apply time stamps to device data generated by the industrial devices to yield time-stamped device data; and collecting the time-stamped device data from the industrial devices.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 9 is a flowchart of an example methodology for coordinated sampling and time-stamping of industrial data for collective analysis or automation system simulation.

DETAILED DESCRIPTION

Figure 1:
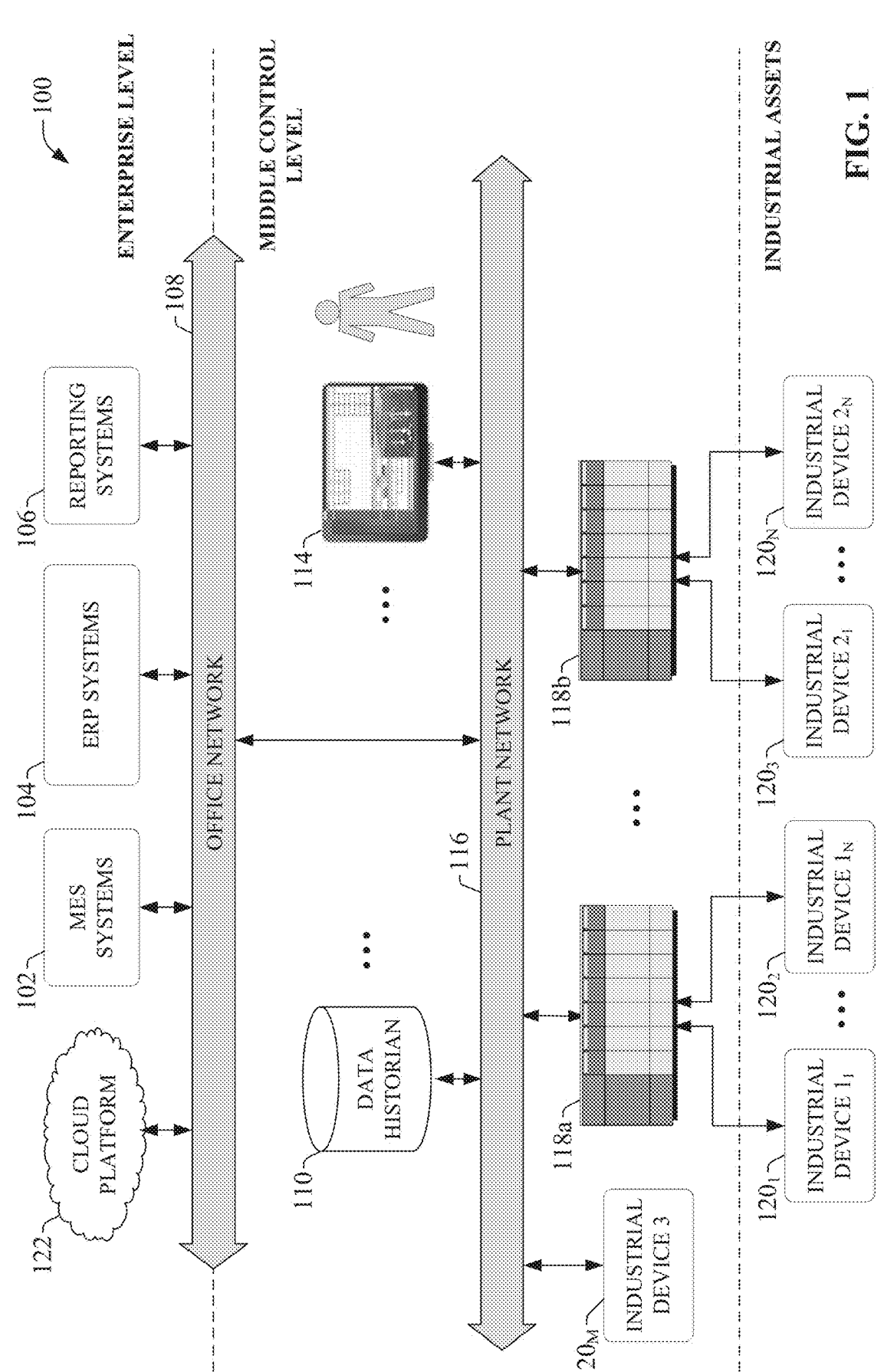
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device $120_{M}$, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

As industrial enterprises become increasingly reliant on high level analytic or simulation systems to gain deeper insights into their manufacturing systems and processes, on-premise edge devices are being used to aggregate data of interest from industrial devices and migrate that data to higher level systems for storage, visualization, or analysis. In some cases, these edge devices may also perform edge-level analysis of industrial data aggregated from multiple data sources (e.g., industrial controllers, telemetry devices, sensors, etc.), allowing data to be captured and analyzed at or near the source devices.

However, the ability to acquire data from multiple industrial devices in a coordinated manner, such that data samples collected from these devices are accurately aligned in time, is challenged by various factors that prevent accurate and consistent sampling and time-stamping of the data items. For example, in scenarios in which data samples are time-stamped by their source devices or by an edge device that aggregates data samples from one or more industrial devices, the values of the time stamps are partly a function of network access time (or the latency between the time that a data item is requested and the time that the date item is received in response to the request), which itself can be affected by the available network bandwidth at the time the data samples were acquired. This can adversely affect data analytics applied to the time-stamped data, since the accuracy of the time stamps across different data sets can vary as a function of network traffic or other factors, and as such the relative timings between events represented by the data samples may not accurately reflect the actual relative timings. Moreover, the time stamps of different items of data that were intended to be sampled at the same point in time of a machine's operating cycle may not be aligned in time, due to both the inconsistency of network bandwidth and the fact that the industrial devices may have internal clocks that do not adhere to a common time reference across the devices.

To address these and other issues, one or more embodiments described herein provide industrial devices and edge compute platforms capable of synchronizing their internal clocks to provide a common sense of time across application and data acquisition tasks, thereby allowing for an inherent common understanding of time across the devices and data sets. In some embodiments, the industrial devices can synchronize their internal clocks using Precision Time Protocol (PTP) or IEEE 802.1AS synchronization. The accurate time stamping achieved by this synchronization can yield more accurate analysis of data sets acquired from multiple devices, and also greater fidelity and synchronization between a digital twin of an automation system and the physical system represented by the digital twin.

Figure 2:
FIG. 2 a block diagram of an example edge device.

FIG. 2 is a block diagram of an example edge device 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Edge device 202 can include a user interface component 204, an edge gateway component 206, a modeling component 208, an analytics component 210, a synchronization component 212, one or more processors 218, and memory 220. In various embodiments, one or more of the user interface component 204, edge gateway component 206, modeling component 208, analytics component 210, synchronization component 212, the one or more processors 218, and memory 220 can be electrically and/or communicatively coupled to one another to perform one or more of the functions of the edge device 202. In some embodiments, components 204, 206, 208, 210, and 212 can comprise software instructions stored on memory 220 and executed by processor(s) 218. Edge device 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to exchange information between the edge device 202 and a client device having authorization to access the edge device. In some embodiments, user interface component 204 can be configured to generate and deliver interface displays to the client device that allow the user to browse and view data samples collected from devices of an industrial automation system, view results of analytics applied to the data, view simulations of the automation system performed using the data, or perform other such interactions with the edge device 202. User interface component 204 can also visualize collected data in various formats, including time-series plots, animated visualizations, results of predictive or prescriptive analytics applied to the data, or other such formats.

Edge gateway component 206 can be configured to communicatively connect to industrial devices in service at a plant facility—e.g., industrial controllers, telemetry devices, motor drives, etc.—and to discover data available on those devices (e.g., data tags, data registers, smart objects, or other data items available for collection). The edge gateway component 206 can also be configured to retrieve selected subsets of these data items during runtime operation and migrate this collected data to higher level systems—such as cloud-based analytic, simulation, or reporting systems—or to store the collected data on the edge device (e.g., in memory 220) for edge-level analysis or simulation.

Modeling component 208 can be configured to generate, update, or otherwise maintain a digital twin or another type of digital model of an industrial automation system from which the data items are acquired. The digital twin can serve as a digital representation of the automation system that, when provided with real-time or historical data generated by devices that make up the automation system, simulates real-time or historical behavior of the automation system at a highly granular level. Analytics component 210 can be configured to apply edge-level analytics to the collected industrial data. This can include, for example, simulating behaviors of the physical automation system based on time-stamped data received from the industrial devices that make up the automation system together with the digital twin maintained by modeling component 208.

Synchronization component 212 can be configured to synchronize an internal clock maintained by the edge device 202 with the internal clocks of the industrial devices from which the industrial data is acquired. In various embodiments, the synchronization component 212 can support the use of PTP or IEEE 802.1AS protocol to maintain synchronization between the edge device 202 and the industrial devices from which the edge device collects and aggregates data.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
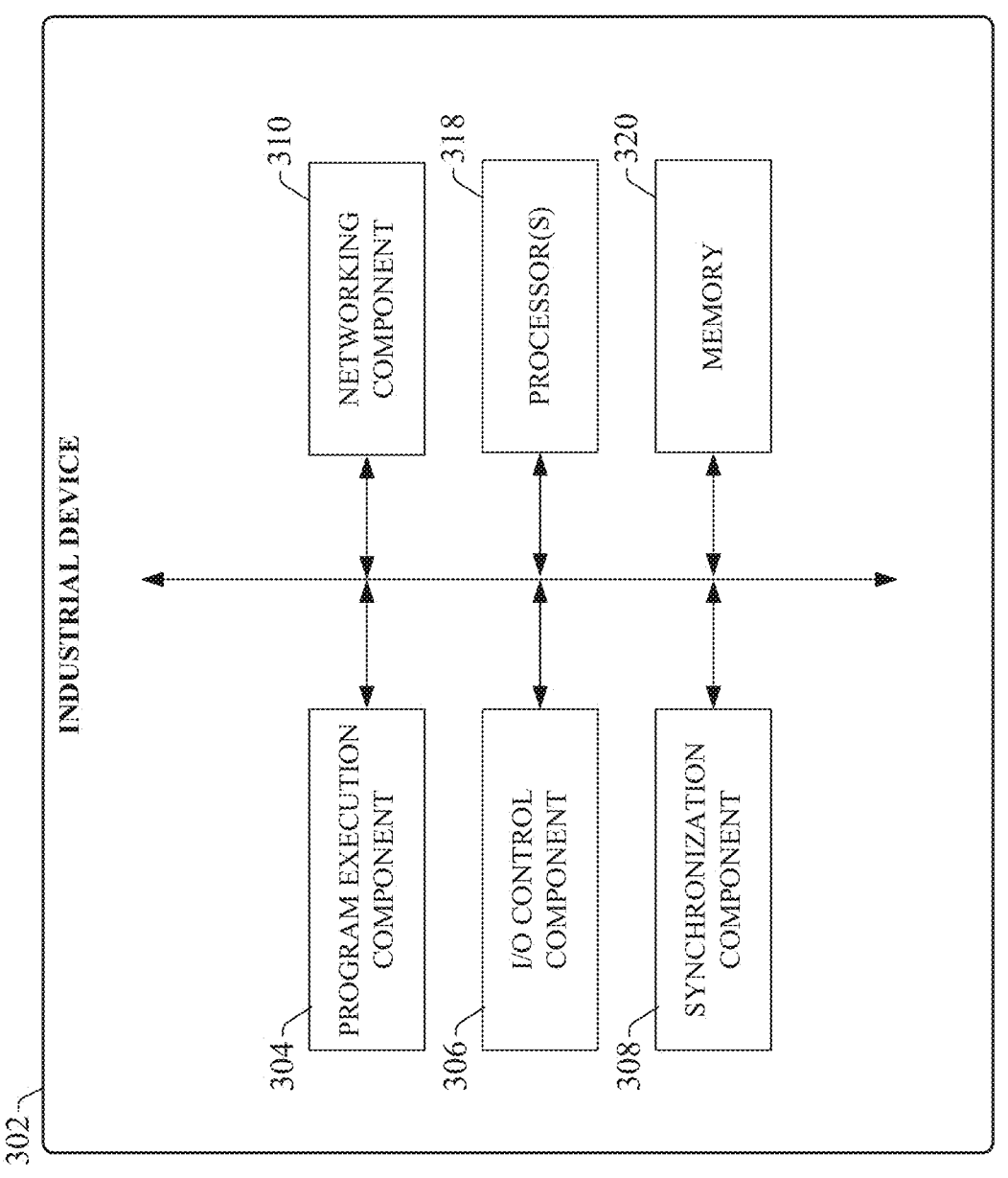
FIG. 3 is a block diagram of an example industrial device that supports time synchronization.

FIG. 3 is a block diagram of an example industrial device 302 that supports time synchronization according to one or more embodiments of this disclosure. Although the example industrial device 302 illustrated in FIG. 3 is depicted as an industrial controller capable executing an industrial control program for processing input signals from industrial input devices and controlling output signals to industrial output devices, industrial device 302 can comprise substantially any type of data-generating industrial device, including but not limited to an industrial controller, a motor drive, an HMI terminal, a telemetry device (e.g., a flow meter, a temperature meter, a pressure meter, etc.), a sensor, an safety input device, or other such device or system. Industrial device 302 can include a program execution component 304, an I/O control component 306, a synchronization component 308, a networking component 310, one or more processors 318, and memory 320. In various embodiments, one or more of the program execution component 304, I/O control component 306, synchronization component 308, networking component 310, the one or more processors 318, and memory 320 can be electrically and/or communicatively coupled to one another to perform one or more of the functions of the industrial device 302. In some embodiments, components 304, 306, 308, and 310 can comprise software instructions stored on memory 320 and executed by processor(s) 318. Industrial device 302 may also interact with other hardware and/or software components not depicted in FIG. 3. For example, processor(s) 318 may interact with one or more external user interface devices, such as a keyboard, a mouse, a display monitor, a touchscreen, or other such interface devices.

Program execution component 304 can be configured to compile and execute a user-defined control program or executable interpreted code. In various embodiments, the control program can be written in any suitable programming format (e.g., ladder logic, sequential function charts, structured text, C++, Python, Javascript, etc.) and downloaded to the industrial device 302. Typically, the control program uses data values read by the industrial device's analog and digital inputs as input variables, and sets values of the industrial device's analog and digital outputs in accordance with the control program instructions based in part on the input values. These input and output values, as well as data values generated by the control program itself, are stored on the industrial device's data table. I/O control component 306 can be configured to control the electrical output signals of the industrial device's digital and analog electrical outputs in accordance with the control program outputs, and to convert electrical signals on the industrial device's analog and digital inputs to data values that can be processed by the program execution component 304.

Synchronization component 308 can be configured to synchronize an internal clock maintained by the industrial device 302 with the internal clocks of other industrial devices, edge devices, or systems. Similar to the synchronization component 212 of the edge device 202, synchronization component 308 can support the use of PTP or IEEE 802.1AS protocol to maintain synchronization with other industrial devices from which data will be collected by the edge device.

Networking component 310 can be configured to exchange data with one or more external devices over a wired or wireless network using any suitable network protocol. Data that can be exchanged via the networking component 310 can include, but is not limited to, synchronization messages used to maintain synchronization between the internal system clock of the device 302 and the system clocks of other industrial devices. The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
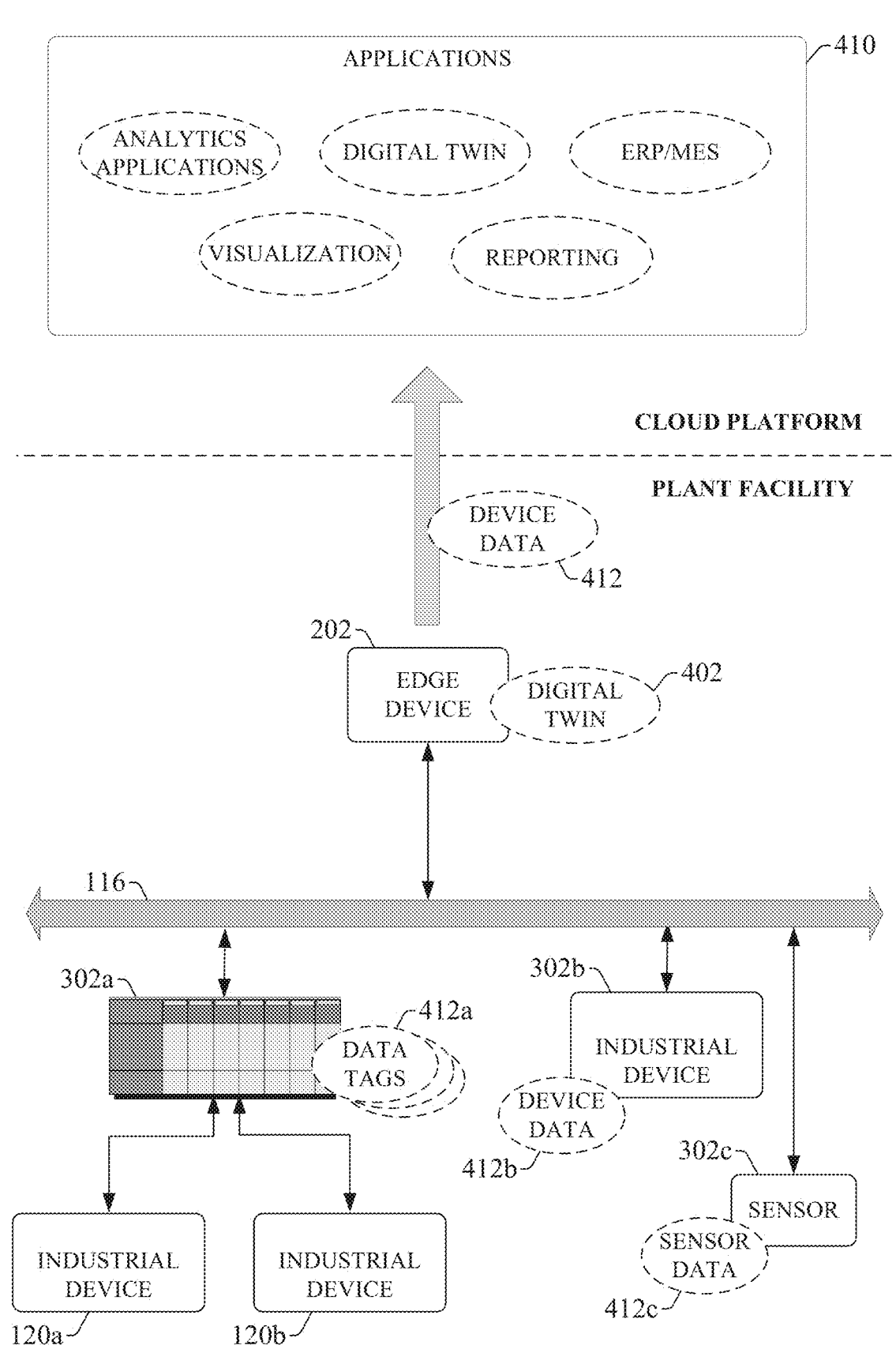
FIG. 4 is a diagram illustrating an example architecture in which an edge device collects and aggregates industrial device data from industrial devices on the plant floor.

FIG. 4 is a diagram illustrating an example architecture in which an edge device 202 collects and aggregates industrial device data 412 from industrial devices 302 on the plant floor for the purposes of edge-level analysis or migration of the data 412 to one or more external applications 410. In this example, the edge device 202 is a network infrastructure device that resides on the plant network 116 and communicatively interfaces with industrial devices 302 on the network 116. The edge device 202 (using edge gateway component 206) can aggregate device data 412 from industrial devices 302 that make up one or more automation systems in operation within the plant facility. In the case of industrial controllers (e.g., industrial device 302a), some of this device data 412a can be obtained from data tags defined on industrial controllers, which store data generated internally by the control program being executed by the controller as well as data generated by industrial devices (e.g., devices 120a and 120b) connected to the controller's I/O. The edge device 202 may also collect data from industrial devices, systems, sensors, or telemetry devices—such as industrial device 302b and 302c—that operate on the plant network 116 without being interfaced with the industrial controller (e.g., motor drives, meters, etc.). In architectures in which edge device 202 is used to link industrial devices 302 to external applications 410, such as applications 410 executing on a cloud platform or another external platform or network, these target applications 410 can include, but are not limited to, cloud-based analytics or simulation applications, visualization systems that provide graphical views of the data 412, reporting systems, ERP or MES systems, or other such consumers of industrial device data 412.

Figure 5:
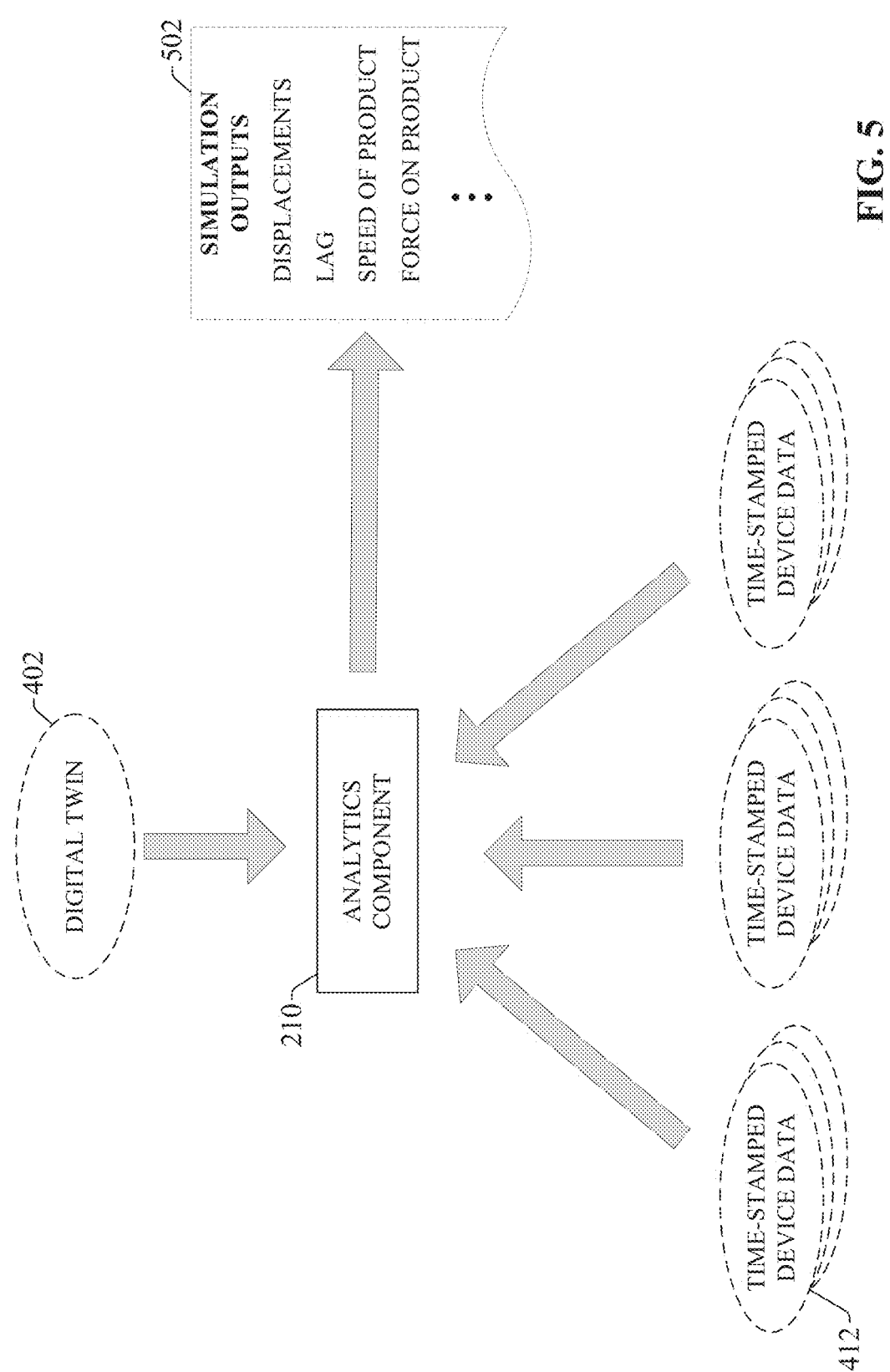
FIG. 5 is a diagram illustrating execution of an automation system simulation using a digital twin and time-stamped device data.

In some embodiments, edge device 202 may perform edge-level simulation of the automation system being monitored and controlled by the industrial devices 302 using a digital twin 402 or another digital model of the automation system. FIG. 5 is a diagram illustrating execution of an automation system simulation using the digital twin 402 and time-stamped device data 412. The digital twin 402 (generated or maintained by the edge device's modeling component 208) can digitally model physical and operational properties of the industrial assets that make up the automation system, and which are monitored and controlled by the industrial devices 302. The digital twin 402 may model mechanical properties of the assets themselves (e.g., mechanical structures and their dimensions, relative locations of mechanical components, properties of mechanical joints, coefficients of friction, inertias, gear ratios, types and sizes of actuators used in the automation system, etc.), properties of associated materials such as fluids, or other such properties of the automation system. As part of these mechanical representations, the digital twin 402 can also encode mechanical formulas representing mechanical transformations applied by components of the industrial assets (e.g., formulas representing torque, speed, or force translations).

During runtime of the automation system, the edge device's analytics component 210 can execute a simulation of the automation system's operation as a function of time using the digital twin 402 together with the time-stamped device data 412. This simulation can generate simulation output data 502 that holistically describes real-time or historical behavior of various components or aspects of the automation system based on analysis of the time-stamped device data 412 in combination with the digital twin 402. In an example scenario, the time-stamped device data 412 can include such information as current operating modes of the automation system or its component stages, positions of machine components or manufactured products, velocities (e.g., velocities of conveyors or other motor-driven assets, robot operating speeds, etc.), flows, pressures, electrical currents, part presence or human presence indications, safety device triggering events (e.g., emergency stop pushbutton events, emergency pull cord events, light curtain breaks, etc.), or other such measured values.

The analytics component 210 can execute a simulation that applies the asset properties and formulas defined by the digital twin 402 to the time-stamped device data 412, and generate simulation output data 502 representing time-series behaviors of the automation system during runtime based on results of this simulation. Example simulated behaviors that can be generated by the analytics component 210 based on the simulation can include, but are not limited to, calculated forces that act on machine components or on a product being manufactured or moved through the automation system, a speed or displacement machine components or products over time, absolute and relative positions of the automation system's various mechanical components or products, inferred error conditions on the automation system, or other such data 502. In this way, the simulation acts as a digital virtualization of the automation system that mirrors its runtime operation. In some cases, the analytics component 210 can also apply predictive analysis to the simulation to predict a future state or condition of the automation system.

In another example use case, the analytics component 210 can monitor the time-stamped device data 412 over time to infer baseline values of various performance metrics of the automation system during normal operation. These baseline performance metrics can include baseline values of key performance metrics (KPIs) such as component speeds, product throughput, electrical loads on components of the automation system (e.g., currents or voltages), pressures, flows, or other such metrics. In cases in which a performance metric may have different optimal values for different stages of a machine cycle performed by the automation system, the analytics component 210 can compute multiple baseline values for the performance metric for respective different stages of the machine cycle. Once these baselines indicative of normal operation are established, the analytics component 210 can monitor the device data 412 during runtime to determine whether the time-stamped data 412 indicates a deviation from the established baselines in excess of a tolerance, which is indicative of abnormal performance. In response to detecting such a deviation, the analytics component 210 can initiate a suitable action, including but not limited to sending notifications to plant personnel or sending a control signal to the automation system that alters operation of the automation system in a manner expected to mitigate the impact of the abnormal performance.

Figure 6:
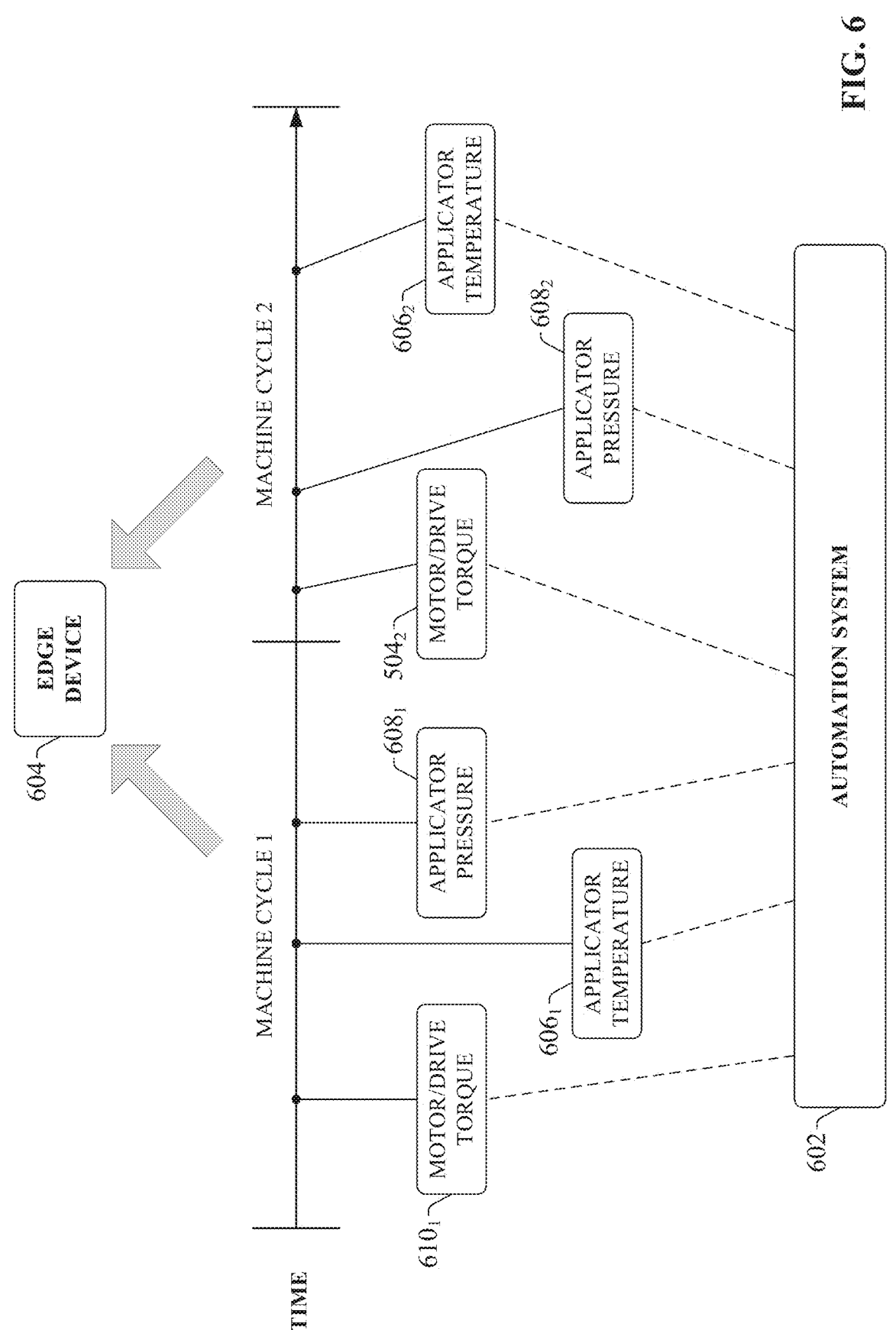
FIG. 6 is a diagram illustrating inconsistent alignment of sampled device data in time when common data sampling approaches are used.

Time-series analysis of the device data 412—e.g., the simulation described above or another type of analysis—requires the data 412 to be accurately time-stamped to indicate the times at which the values of the data were sampled. In order to digitally represent the automation system and its runtime operation at a high level of accuracy and granularity, items of device data 412 should be sampled and time-stamped in a coordinated manner such that the time stamps for a given machine cycle or period accurately reflect the times at which their data was sampled and are aligned in time for collective analysis. However, the ability to acquire data from multiple industrial devices in a coordinated manner, such that data samples are collected from these devices at substantially the same time to a high degree of precision and are accurately time-stamped, is challenged by various factors. FIG. 6 is a diagram illustrating inconsistent alignment of sampled device data in time when common data sampling approaches are used. In the illustrated example, data values generated by telemetry devices of an automation system 602 (e.g., motor torque, applicator pressure, applicator temperature, etc.) are sampled once per machine cycle during runtime operation. However, in some applications data samples can be sampled multiple times per machine cycle to create a machine cycle signature. Two consecutive machine cycles (Machine Cycle 1 and Machine Cycle 2) are depicted in FIG. 6, with motor torque values 610, applicator temperature values 606, and applicator pressure values 608 being sampled once per cycle and sent to an edge device 604.

In scenarios in which data samples are time-stamped by their source devices or by the edge device 604, the values of the time stamps applied to the data values 610, 606, 608 are partly a function of network access time (or the latency between the time that a data value is requested and the time that the date value is received in response to the request), which itself can be affected by available network bandwidth at the time the data samples were acquired. This can result in time stamps that are misaligned in time within a given machine cycle, and this misalignment may itself be inconsistent across machine cycles. In the example depicted in FIG. 6, the three different data values 610, 606, and 608 are sampled at different points within a given machine cycle, and these sample times vary between the two consecutive machine cycles. This misalignment of data samples can reduce the accuracy of data analytics applied to the time-stamped data, since data values that are presumed by the analytics to have been sampled at the same point in time during the automation system's operation may not in fact be aligned in time. This can introduce inaccuracies when attempting to correlate automation system events or to execute a digital simulation that mirrors the physical automation system at a high degree of fidelity. To ensure accurate analysis or simulation of the automation system's operation, the time-stamped data values should be synchronized to accuracies of microseconds.

Figure 7:
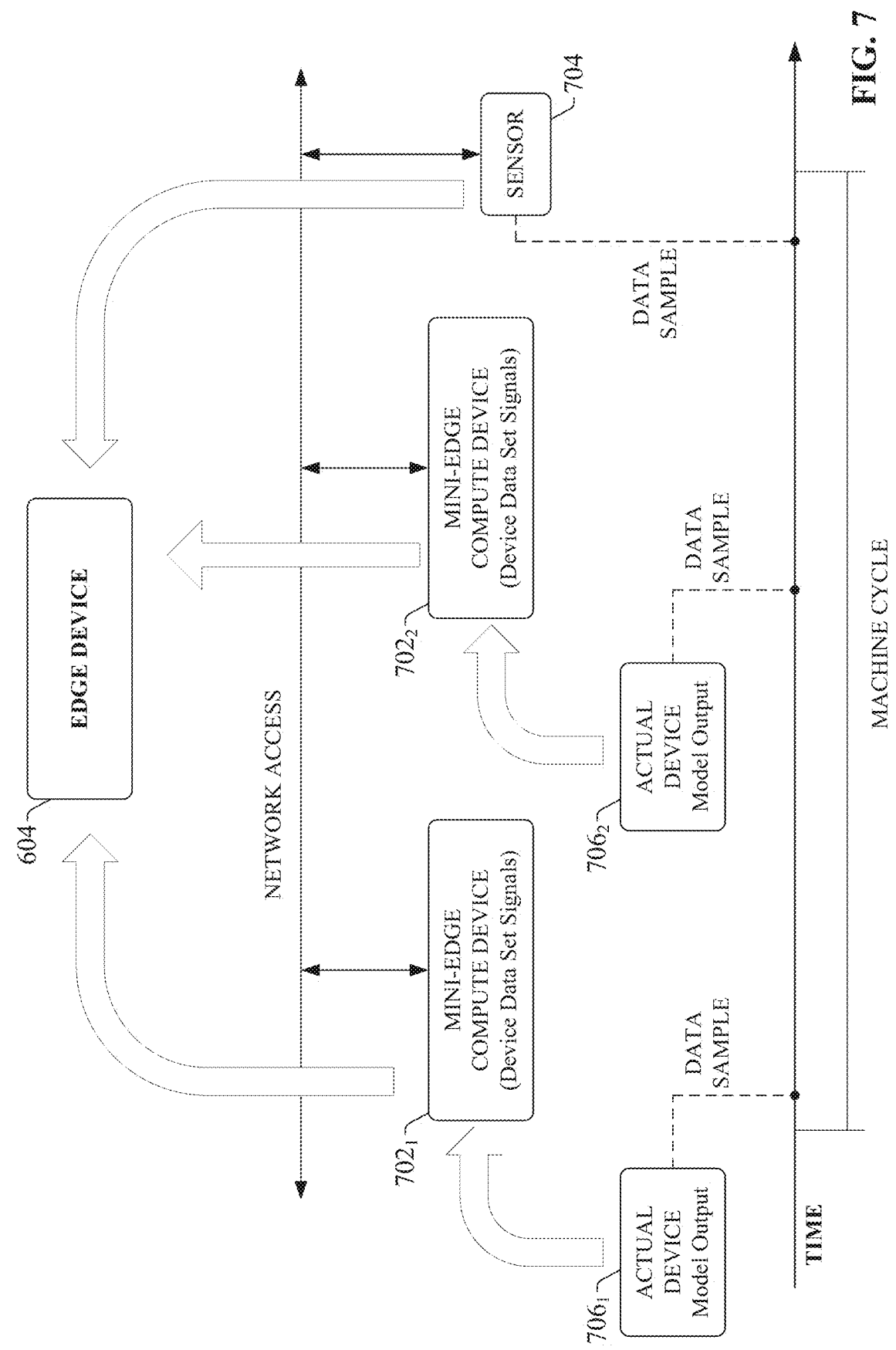
FIG. 7 is a diagram illustrating an example architecture comprising various industrial devices and sensors which monitor and control an industrial automation system and generate associated runtime data which is then captured and aggregated at an edge device.

FIG. 7 is a diagram illustrating an example architecture comprising various industrial devices 706 (e.g., industrial controllers, motor drives, safety relays, etc.) and sensors 704 (e.g., telemetry devices, photo-sensors, meters, etc.) which monitor and control an industrial automation system (not shown) and generate associated runtime data which is then captured and aggregated at an edge device 604. In some cases, data generated by an industrial device or sensor (such as sensor 704) is sent directly from the industrial device to edge device 604 via a shared network. In other cases—as with devices 706₁ and 706₂—the data may be sent from the device 706 to a mini-edge device 702 near the device 706, where the data is buffered before being sent to the edge device 604 for aggregation and analysis with the other data sets captured from the automation system.

In common existing approaches, data samples are time-stamped within their devices 706, 704 of origin, at the mini-edge device 702, or at the edge device 604, and the data is re-assembled at the edge device 604 to align the sampled data received from the multiple data sources. The values of these time stamps are affected by the network access time when the data was sent or received, as well as by the fact that the source devices 706, 704 may have internal clocks that are not synchronized with one another, which further complicates the task of aligning the data sets received from these various devices for common analysis. As shown on the time axis in FIG. 7, this can result in the data samples being captured from the respective devices 706, 704 at different times within the machine cycle, and these data samples will be labeled with time stamps that are not aligned in time within the machine cycle for which the data values were captured.

Coordination of data samples using this approach requires high network bandwidth to ensure sufficient time stamp accuracy throughout the data sets for accurate analysis. This sensitivity to network bandwidth can reduce the accuracy of the time stamps when increased network traffic causes an increase in latency on the network. Limits on network access time can also place limits on the granularity of time-based data samples. This approach can also incur a high processing cost at the embedded device level.

Figure 8:
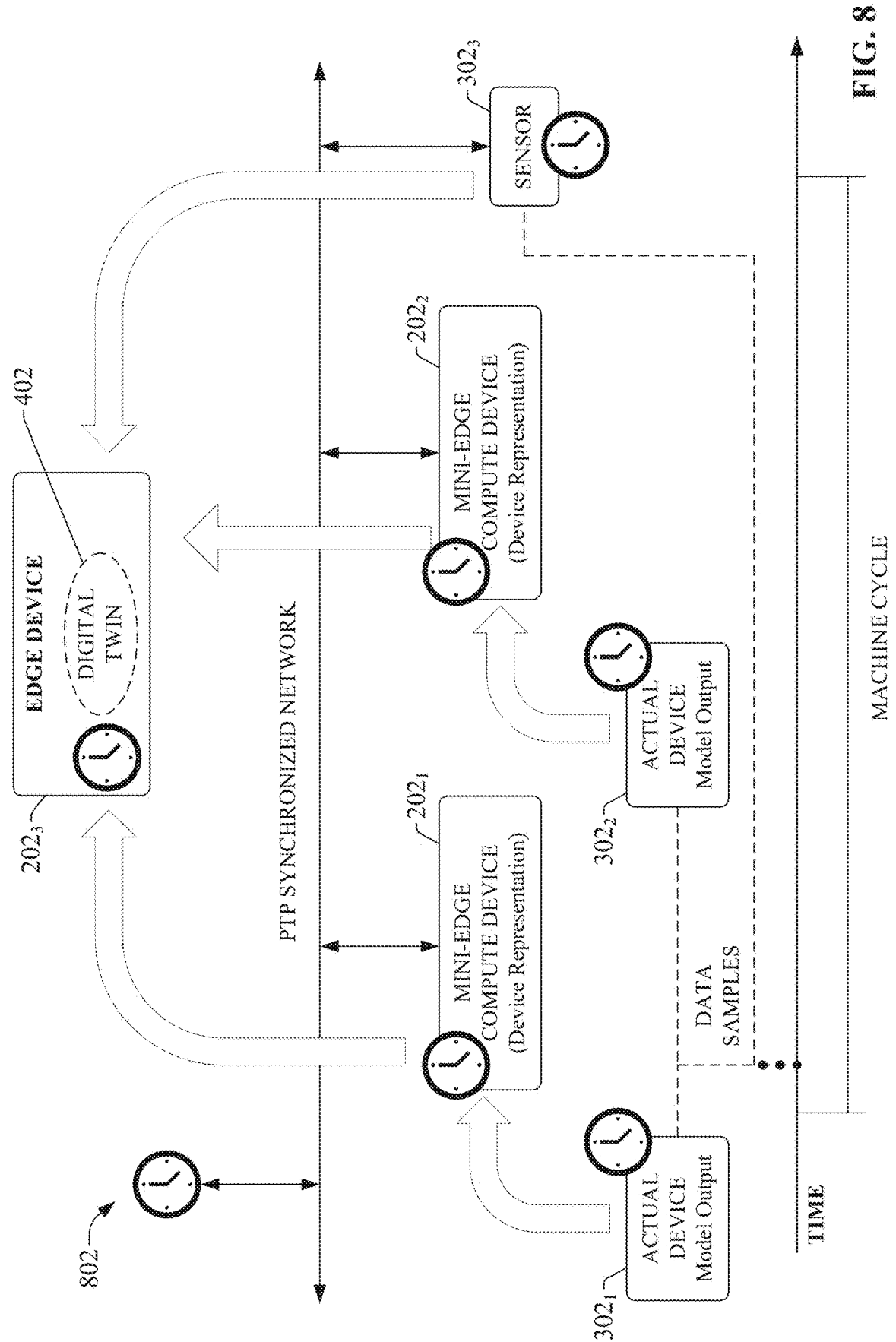
FIG. 8 is a diagram illustrating an example architecture that utilizes industrial devices and edge devices that support time synchronization using PTP protocols, IEEE 802.1AS synchronization, or another synchronization protocol.

FIG. 8 is a diagram illustrating an example architecture that utilizes industrial devices 302 and edge devices 202 that support time synchronization using PTP protocols, IEEE 802.1AS synchronization, or another synchronization protocol. The synchronization components 308 of the industrial devices 302, as well as the synchronization components 212 of the edge devices 202, can be configured to synchronize the internal clocks of their respective devices 202, 302 with those of other devices 202, 302 across a synchronization network. The synchronization network may include the plant network on which the devices 202, 302 reside as well as any connected networks.

Each device's internal clock is used as the basis for generating the time stamps applied by the device 202, 302 to sampled items of device data 412, including data generated by the device 202, 302 itself and any unstamped data received by that device 202, 302 which is to be time-stamped by the device. Synchronizing these clocks across the devices 202, 302, using PTP synchronization protocols or another suitable synchronization protocol, forces the devices 202, 302 to recognize a common sense of time across application and data acquisition tasks, allowing for a common understanding of time across the devices 202, 302. For applications in which data values generated by the industrial devices 302 are sampled for each machine cycle, synchronizing the device clocks across the industrial devices 302 ensures that the data samples are captured at substantially the same time within the machine cycle with a high degree of time precision (e.g., with microsecond precision), thereby aligning the data samples and their corresponding timestamps in time (see the time axis in FIG. 8). Synchronizing the clocks across the devices 202, 302 also ensures that data sets captured from different devices 202, 302 and aggregated at the edge device 202₃ are time-stamped using use a common time reference, making accurate and high-resolution analysis of the data sets possible. In applications in which the edge device 202₃ simulates operation of the automation system using a digital twin 402, as described above, the synchronized data sets provided to the edge device 202₃ can ensure accurate digital representation of the automation system's time-series behavior (with microsecond accuracy)

The synchronization components 212, 308 of the devices can support any suitable synchronization protocol for synchronizing the clocks of their respective devices 202, 303 with one another. As noted above, some embodiments of devices 202, 302 can support PTP synchronization protocols, whereby the synchronization components 212, 308 synchronize the internal clocks of their respective devices 202, 302 to a grandmaster clock 802 accessible via the synchronization network. In this case, the internal device clocks act as transparent clocks, and the synchronization components 212, 308 synchronize their corresponding transparent clocks (their internal device clocks) with the grandmaster clock 802 by exchanging synchronization messages with the grandmaster clock 802. Alternatively, the synchronization components 212, 308 can use a peer-to-peer synchronization protocol that does not require the use of a dedicated grandmaster clock 802, but instead maintains synchronization by exchanging synchronization messages between the devices 202, 302 to bring their respective internal clocks into alignment. The use of an open solution synchronization protocol, such as PTP or 802.1AS, to maintain synchronization also allows third-party devices that support these protocols to participate in the synchronized data acquisition and analysis.

In architectures such as that depicted in FIG. 8, any of the edge devices 202 can digitally represent the automation system, or portions of the automation system, using a digital twin 402 or another type of digital model, and simulate real-time or historical operation of the automation system using the time-stamped data generated by the industrial devices 302 (as described above in connection with FIG. 5). By synchronizing the clocks of the industrial devices 302 that act as sources of the time-stamped data 412, these simulations can more accurately reflect actual operation of the automation system by precisely aligning the timing of the data samples and time-stamping these samples using a common clock reference. Also, aligned and time-stamped data from the industrial devices 302 can be collected and buffered by one or more intermediate devices, such as mini-edge devices 202₁ and 202₂, before being migrated to a higher-level systems, such as edge device 202₃, for analysis or simulation. When aggregated at the edge device 202₃, the time stamps associated with the data items across all aggregated data sets will accord to the common synchronized time standard, ensuring that collective analysis of the data accurately represents real-time conditions of the automation system, and that the relative timings between events represented by the data samples accurately reflect the actual relative timings between those events during runtime of the physical automation system.

The approach described herein for maintaining synchronization between industrial devices 302 that participate in an industrial data capture and analysis architecture can facilitate collection of multi-device coordinated machine data sets without adding substantially to network bandwidth. Synchronization of the device clocks used to apply device-level time stamps on items of industrial data can also allow the resulting time stamped data to be buffered prior to migration to higher-level systems for collective analysis or simulation along with other industrial data sets while ensuring that all data samples are accurately aligned in time. Accurately aligned and time-stamped data can also ensure that digital simulations of automation system operation using a digital twin are accurately synchronized with actual operation of the physical automation system.

FIG. 9 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 9 illustrates an example methodology 900 for coordinated sampling and time-stamping of industrial data for collective analysis or automation system simulation. Initially, at 902, internal clocks of industrial devices that monitor and control and industrial automation system are synchronized using a PTP synchronization protocol, IEEE 802.1AS synchronization, or another synchronization protocol. This ensures that data samples generated by the industrial devices are time-stamped according to a common time reference that is synchronized across the devices to a precision of microseconds. Industrial devices that can be synchronized in this way include, but are not limited to, industrial controllers, motor drives, telemetry devices, safety relays and associated safety input devices, sensors, or other such devices.

At 904, an internal clock of an edge device is also synchronized with the internal clocks of the industrial devices. The edge device can reside on a common network with the industrial devices or is otherwise afforded access to data generated by the industrial devices, and can be configured to aggregate time-stamped data generated by the industrial devices.

With the industrial devices and edge devices synchronized, a determination is made as to whether a current time is equal to a data collection sample time at 906. The sample time can depend on the type of data collection application being implemented. In scenarios in which data samples are to be collected for each operating cycle of the automation system, the sample time can be set to occur at a specified point in time within each operating cycle (e.g., a time defined relative to a start of the operating cycle). If the current time is equal to a data collection sample time (YES at step 906), the methodology proceeds to step 908, where time stamps are applied by the industrial devices to sampled values of data generated by the industrial devices to yield time-stamped data. The values of the time stamps are based on the current times of the respective devices' internal clocks. At 910, the time-stamped data is migrated to the edge device. In some applications, the edge device can perform collective analysis on the time-stamped data, or may execute a simulation of the automation system using the time-stamped data and a digital twin of the automation system.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, Open Platform Communications Unified Architecture (OPC-UA), and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 10:
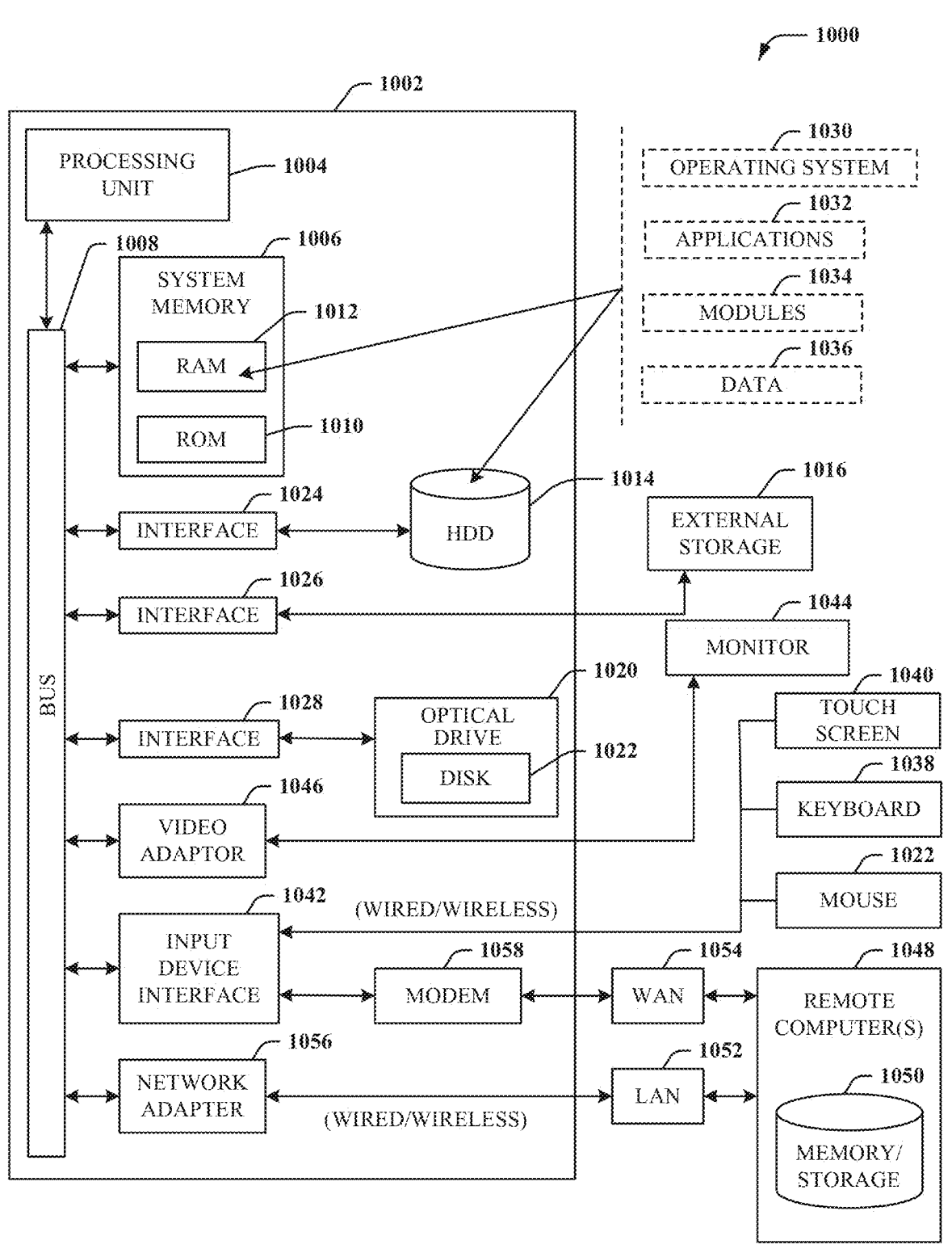
FIG. 10 is an example computing environment.
Figure 11:
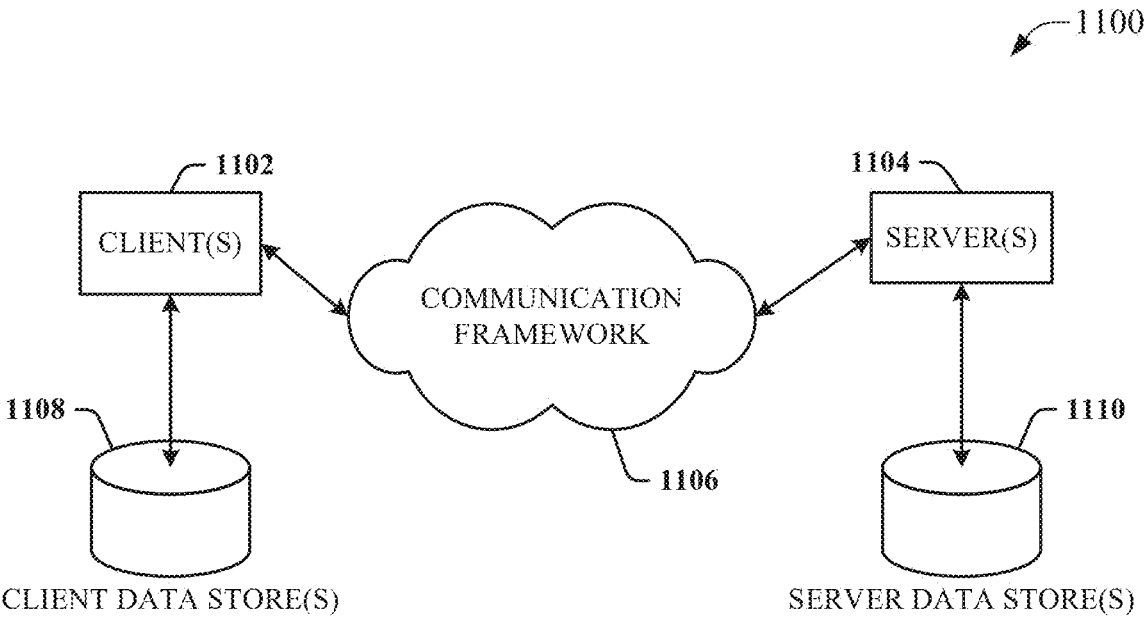
FIG. 11 is an example networking environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for application programs 1032. Runtime environments are consistent execution environments that allow application programs 1032 to run on any operating system that includes the runtime environment. Similarly, operating system 1030 can support containers, and application programs 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1022. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1042 that can be coupled to the system bus 1008, but can be connected by other interfaces, such as a parallel port, an IEEE 1394 serial port, a game port, a USB port, an IR interface, a BLUETOOTH® interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enter-prise-wide computer networks, such as intranets, all of which can connect to a global communications network, e.g., the Internet.

When used in a LAN networking environment, the com-puter 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the adapter 1056 in a wireless mode.

When used in a WAN networking environment, the com-puter 1002 can include a modem 1058 or can be connected to a communications server on the WAN 1054 via other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of estab-lishing a communications link between the computers can be used.

When used in either a LAN or WAN networking envi-ronment, the computer 1002 can access cloud storage sys-tems or other network-based storage systems in addition to, or in place of, external storage devices 1016 as described above. Generally, a connection between the computer 1002 and a cloud storage system can be established over a LAN 1052 or WAN 1054 e.g., by the adapter 1056 or modem 1058, respectively. Upon connecting the computer 1002 to an associated cloud storage system, the external storage interface 1026 can, with the aid of the adapter 1056 and/or modem 1058, manage storage provided by the cloud storage system as it would other types of external storage. For instance, the external storage interface 1026 can be config-ured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, commu-nications satellite, any piece of equipment or location asso-ciated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 10 is a schematic block diagram of a sample com-puting environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

What has been described above includes examples of the subject innovation. It is, of course, not possible to describe every conceivable combination of components or method-ologies for purposes of describing the disclosed subject matter, but one of ordinary skill in the art may recognize that many further combinations and permutations of the subject innovation are possible. Accordingly, the disclosed subject matter is intended to embrace all such alterations, modifi-cations, and variations that fall within the spirit and scope of the appended claims.

In particular and in regard to the various functions per-formed by the above described components, devices, cir-cuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exem-plary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be com-bined with one or more other features of the other imple-mentations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufac-ture using standard programming and/or engineering tech-niques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:
1. A system, comprising:
a memory that stores executable components; and
a processor, operatively coupled to the memory, that executes the executable components, the executable components comprising:

a synchronization component configured to synchronize an internal clock of the system with internal clocks of industrial devices that monitor and control an automation system, wherein the industrial devices comprise at least an industrial controller and a telemetry device, and the internal clocks of the industrial devices are configured to synchronize with one another and are used by the industrial devices to apply time stamps to device data generated by the industrial devices;

an edge gateway component configured to collect the industrial device data from the industrial devices at designated times during respective operating cycles of the industrial automation system, and to migrate the device data and the time stamps to an application, wherein synchronization of the internal clock of the system with the internal clocks of the industrial devices causes a subset of the time stamps for a corresponding subset of the device data collected during one of the operating cycles to be substantially aligned in time; and an analytics component configured to execute a simulation of the industrial automation system using the device data collected from the industrial devices and the time stamps associated with the device data, and to generate simulation output data based on a result of the simulation, wherein the simulation output data represents at least one of forces on components of the automation system, speeds or positions of components of the automation system, error conditions of the industrial automation system, or product throughput.

2. The system of claim 1, wherein the synchronization component is configured to synchronize the internal clock of the system with the internal clocks of the industrial devices using at least one of precision time protocol or Institute of Electrical and Electronic Engineers (IEEE) 802.1AS synchronization.

3. The system of claim 1, wherein the industrial devices further comprise at least one of a motor drive, a safety relay, a safety input device, or an industrial sensor.

4. The system of claim 1, wherein the application executes on a cloud platform or an external network.

5. The system of claim 1, wherein the analytics component is configured to execute the simulation of the industrial automation system using a digital twin of the industrial automation.

6. The system of claim 1, wherein the simulation output data represents time-series behaviors of the industrial automation system.

7. The system of claim 1, wherein the analytics component is further configured to infer, based on an analysis of the device data over time, a baseline value of a performance metric of the industrial automation system, and to detect, based on monitoring of the device data performed subsequent to the analysis, a deviation of the device data from the baseline value in excess of a defined tolerance.

8. A method, comprising:

synchronizing, by an edge device comprising a processor, an internal clock of the edge device with internal clocks of industrial devices that monitor and control an industrial automation system, wherein the industrial devices comprise at least an industrial controller and a telemetry device, and the internal clocks of the industrial devices are configured to synchronize with one another and are used by the industrial devices to apply time stamps to device data generated by the industrial devices to yield time-stamped device data;

collecting, by the edge device, the time-stamped device data from the industrial devices at designated times within respective operating cycles of the industrial automation system, wherein the synchronizing of the internal clock of the edge device with the internal clocks of the industrial devices causes a subset of the time stamps for a corresponding subset of the device data collected during one of the operating cycles to be substantially aligned in time;

migrating, by the edge device, the device data and the time stamps to an application;

executing, by the application, a simulation of the industrial automation system using the device data collected from the industrial devices and the time stamps associated with the device data; and generating, by the application, simulation output data based on a result of the simulation, the simulation output data representing at least one of forces on components of the automation system; speeds or positions of components of the automation system, error conditions of the industrial automation system, or product throughput.

9. The method of claim 8, wherein the synchronizing comprises synchronizing the internal clock of the edge device with the internal clocks of the industrial devices using at least one of precision time protocol or Institute of Electrical and Electronic Engineers (IEEE) 802.1AS synchronization.

10. The method of claim 8, wherein the industrial devices further comprise at least one of a motor drive, a safety relay, a safety input device, or an industrial sensor.

11. The method of claim 8, wherein the application executes on a cloud platform or an external network.

12. The method of claim 8, wherein the executing comprises executing the simulation of the industrial automation system using a digital twin of the industrial automation.

13. The method of claim 8, wherein the simulation output data represents time-series behaviors of the industrial automation system.

14. A non-transitory computer-readable medium having stored thereon instructions that, in response to execution, cause an edge device comprising a processor and executing on a cloud platform to perform operations, the operations comprising:

synchronizing an internal clock of the edge device with internal clocks of industrial devices that monitor and control an industrial automation system, wherein the industrial devices comprise at least an industrial controller and a telemetry device, and the internal clocks of the industrial devices are configured to synchronize with one another and are used by the industrial devices to apply time stamps to device data generated by the industrial devices to yield time-stamped device data;

collecting the time-stamped device data from the industrial devices at defined times within respective operating cycles of the industrial automation system, wherein the synchronizing of the internal clock of the edge device with the internal clocks of the industrial devices causes a subset of the time stamps for a corresponding subset of the device data collected during one of the operating cycles to be substantially aligned in time;

migrating the device data and the time stamps to an application; and executing a simulation of the industrial automation system using the device data collected from the industrial devices and the time stamps associated with the device data; and generating simulation output data based on a result of the simulation, the simulation output data representing at least one of forces on components of the automation system, speeds or positions of components of the automation system, error conditions of the industrial automation system, or product throughput.

15. The non-transitory computer-readable medium of claim 14, wherein the synchronizing comprises synchronizing the internal clock of the edge device with the internal clocks of the industrial devices using at least one of precision time protocol or Institute of Electrical and Electronic Engineers (IEEE) 802.1AS synchronization.

16. The non-transitory computer-readable medium of claim 14, wherein the executing comprises executing the simulation of the industrial automation system using a digital twin of the industrial automation.

17. The system of claim 1, wherein the application is at least one of a cloud-based analytics or simulation application, a visualization system that generates and renders a graphical view of the device data, a reporting system, an enterprise resource planning system, or a manufacturing execution system.

18. The method of claim 8, wherein the application is at least one of a cloud-based analytics or simulation application, a visualization system that generates and renders a graphical view of the device data, a reporting system, an enterprise resource planning system, or a manufacturing execution system.

19. The non-transitory computer-readable medium of claim 14, wherein the industrial devices further comprise at least one of a motor drive, a safety relay, a safety input devices, or an industrial sensor.

20. The non-transitory computer-readable medium of claim 14, wherein the executing comprises executing the simulation of the industrial automation system using a digital twin of the industrial automation.

* * * * *